United States Patent Office 2,831,839
Patented Apr. 22, 1958

2,831,839

OXYGEN-CONTAINING CHLORINATED AND BROMINATED POLYMERS

Peter J. Canterino, Bartlesville, Okla., and James N. Baptist, Olmsted Falls, Ohio, assignors to Phillips Petroleum Company, a corporation of Delaware No Drawing. Application July 11, 1955
Serial No. 521,376

26 Claims. (Cl. 260—82.1)

This invention relates to new polymeric materials, and to methods of producing same. In one aspect, this invention relates to the reaction of base polymeric materials containing ethylenic unsaturation with a halogen selected from the group consisting of chlorine and bromine, in the presence of an oxygen-containing compound having only one functional reactive group. In another aspect, this invention relates to new polymers containing halogen and oxygen. In still another aspect, the invention relates to the reaction of polymeric materials containing ethylenic unsaturation with a halogen selected from the group consisting of chlorine and bromine and with at least one organic compound selected from the group consisting of an organic hydroxy compound and a carboxy compound, said organic compound containing only one functional reactive group, said reaction being effected in the presence of a solvent. In still another aspect, the invention relates to the reaction of polymeric materials selected from the group consisting of homopolymers of conjugated dienes, copolymers of conjugated dienes, and natural rubber with a halogen selected from the group consisting of chlorine and bromine in the presence of at least one organic compound selected from the group consisting of an organic hydroxy compound and a carboxylic acid, said organic compound containing only one functional reactive group, said reaction being effected in the presence of a solvent. The word "base" as used here and in the claims means only that the polymer is a starting material and is not to be taken as a description of any of its properties, physical or chemical.

An object of the invention is to provide a process for the concomitant reaction of ethylenically unsaturated polymers with a halogen and an oxygenated organic compound having one functional reactive group. Another object is to prepare new derivatives of ethylenically unsaturated polymers which contain added halogen and oxygen-containing substituents.

Other objects as well as aspects and advantages of the invention are apparent from a study of the disclosure and the appended claims.

According to our invention, a polymeric material containing ethylenic unsaturation is halogenated in the presence of a solvent with a halogen selected from the group consisting of chlorine and bromine in the presence of at least one organic compound containing only one functional reactive group selected from the group consisting of hydroxy and carboxy, said organic compound being present in an amount at least equal to the weight of the polymeric material. The products resulting are polymers containing chloro and/or bromo groups, and also containing at least one of the substituents selected from the group consisting of an alkoxy group, a cycloalkoxy group, an aryloxy group, and an acyloxy group derived from a carboxylic acid.

Polymers of superior solubility properties are obtained in accordance with this process. This solubility is important not only from the standpoint of utility or application of the polymeric products but also from the standpoint of reaction difficulties which are otherwise encountered in many chlorination processes because of gelation of the polymeric materials during chlorination.

Polymers which are applicable as starting materials in this invention contain ethylenic bonds. The reaction which occurs is one of halogenation of the double bond and also addition of a group from the oxygen-containing reactive compound, e. g., alkoxy, cycloalkoxy, aryloxy or acyloxy group. For example, if a polymer, e. g. polybutadiene, is dissolved in an inert solvent such as carbon tetrachloride or benzene, and methanol is added and chlorine is introduced, addition to the ethylenic double bond results in groups of the following type along the polymer chain:

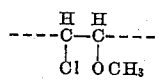

Likewise, if an acid such as acetic acid is used instead of methanol, the following type of addition to the double bond results:

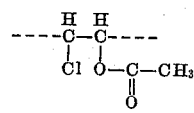

Thus the products of this invention contain groups along the polymer chain as indicated by the following formula:

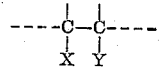

where X is chlorine or bromine and Y is an alkoxy, cycloalkoxy, aryloxy or an acyloxy group derived from a carboxylic acid. The respective groups represented by Y contain no functional substituent group, but the terms alkoxy, cycloalkoxy and aryloxy include, of course, nonfunctional substituents, as is understood in the art, such as hydrocarbon groups, e. g., the alkyl group can contain an aryl or cycloalkyl substituent, or the aryl group can contain an alkyl substituent.

It is probable that some of the double bonds in the polymer are halogenated with no oxygen-containing radicals being added. In addition to addition reactions to the double bonds, some substitution of halogen for hydrogen may also occur. In any event, products result which are soluble in various organic solvents such as carbon tetrachloride, benzene, and the like and which products contain halo groups, and also one of the enumerated oxygen-containing substituents. The good solubility characteristics of the products indicate the presence of little or no cross-linking, as will be understood by those skilled in the art. In addition to producing new products, the present process solves a definite problem in the chlorination of certain of these polymers, e. g., in the chlorination of a rubbery polybutadiene homopolymer, or of a copolymer of butadiene with acrylic acid or with ethyl acrylate, in the presence of a solvent, but in the absence of such oxygen-containing compound, cross-linking occurs and insoluble products form which gel during chlorination.

The now preferred base polymeric materials from which soluble oxygen-containing chlorinated and/or brominated products are obtained according to the invention are conjugated diene homopolymers and copolymers. The conjugated dienes from which the polymers are obtained preferably contain from 4 to 10 carbon atoms per molecule. Examples of such conjugated dienes are 1,3-butadiene, isoprene, chloroprene, piperylene, 2,3-dimethyl-1,3-butadiene, phenylbutadiene, 2,3-dimethyl-1,3-hexadiene, 2-methoxy-1,3-butadiene, etc. Examples of materials with which the conjugated diene can be copolymerized are styrene, alpha-methylstyrene, isobutylene, and alkyl, alkoxy and halogen-substituted styrenes, acrylic and methacrylic acids and their esters, such as methyl, ethyl, propyl, isopropyl, isobutyl, normal butyl, etc., acrylates and methacrylates; methyl vinyl ketone, methyl isopropenyl ketone, acrylonitrile, methacrylonitrile, methacrylamide, 2-phenyl-4-hydroxy-1-butene, dimethylvinylethynyl carbinol, hydroxyethyl acrylate, hydroxyethyl methacrylate, hydroxyethylstyrene, 2-vinylpyridine, 2-methyl-5-vinylpyridine, 2,3,4-trimethyl-5-vinylpyridine, 2,6-dimethyl-4-vinylpyridine, vinyl acetate, vinyl chloride, vinylidene chloride, vinylfurane, vinylcarbazole, and 2-hydroxyethyl-5-vinylpyridine. A copolymeric starting material can result from the copolymerization of two or more conjugated dienes with each other, or from the copolymerization of one or more vinyl compounds with one or more conjugated dienes. Natural rubber is a base polymeric material, i. e., a starting polymeric material, within the scope of our invention.

It is now preferred in many instances in the case of a base polymeric material which contains a polar functional group, such as carboxy, hydroxy, carbonyl or nitrile, that the organic oxygen-containing compound be a carboxylic acid since products resulting usually have greater solubility in solvents than if the organic oxygen-containing compound is a hydroxy compound.

In the production of the halogenated polymeric material according to our invention, the polymeric starting material is dispersed in a solvent or diluent. Examples of such solvents include carbon tetrachloride, chloroform, tetrachloroethane, chlorobenzene, and aromatic hydrocarbon solvents such as benzene, toluene, and xylene. The initial concentration of the polymer in the dispersion, based on the combined weight of solvent or diluent and polymer, but exclusive of the said oxygen-containing compound, can be in the range between 0.5 and 50 percent by weight. When the polymeric starting material is a solid, the concentration is generally not above 10 percent, and more usually not above 6 percent by weight on the same basis. Higher or lower polymer concentrations can be employed within the scope of the invention.

The solvent is preferably not adversely reactive under the conditions of operation, and usually an inert solvent is employed.

The solvent or diluent employed in our process preferably dissolves both the initial polymeric material and the reaction product. However, it is possible to employ a solvent which dissolves only the reaction product as it is formed. Thus, in such a case the polymer can be suspended in a diluent which does not appreciably dissolve it but which does dissolve the reaction product. Thus, the reaction is effected in every case in the presence of a solvent for the reaction product.

Examples of organic-oxygen-containing compounds, hereinbefore mentioned, in which only one reactive group is present, include monohydric alcohols such as methanol, ethanol, isopropanol, 1-butanol, 2-butanol, isobutyl alcohol, 1-pentanol, 2-pentanol, 3-pentanol, the hexanols, such as 1-hexanol, 2-hexanol, and so on, isoheptyl alcohol, and octanol; phenols, such as phenol and various alkyl and alkoxy derivatives of phenols such as di-sec-amylphenol di-tert-amylphenol, the o-, m-, and p-cresols, the xylenols such as 2,3-, 2,4-, 2,5-, 2,6-, 3,4-xylenols, para-tert-butylphenol, ortho-butoxyphenol, para-methoxyphenol, ortho-, meta- and para-ethylphenols; also, monohydroxy naphthalenes such as 1-naphthol and 2-naphthol; monohydroxy cycloalkanes such as cyclohexanol; monocarboxylic acids such as acetic, propanoic, butanoic, 2-methylpropanoic, pentanoic, hexanoic and octanoic acids; ethers containing only one hydroxy group such as monoethers of alkylene glycols such as monomethyl, monoethyl, monopropyl and monobutyl ethers of ethylene glycol and of propylene glycol, and alkylene oxide condensation products with monohydric alcohols such as diethylene glycol monomethyl ether and diethylene glycol monoethyl ether. It is now generally preferred that the organic oxygen-containing compound containing only one reactive group, which is employed in the process, have a molecular weight below 350. The organic oxygen-containing compound containing only one reactive group is employed in the process of our invention generally in an amount in the range between 1 and 25 parts by weight per part of polymer dissolved in the reaction mixture solvent. Of course, as will be understood by those skilled in the art, certain of the oxygen-containing compounds will tend to lower the maximum solubility of the polymer or its reaction product in the solvent and, therefore, in any particular instance, is is desirable to so adjust the concentration of polymer and/or of the organic oxygen-containing compound so that all of the polymer, and especially its reaction product, will remain in solution, as can easily be determined by routine tests.

Halogens which are employed are chlorine and bromine. The amount of halogen used depends in part upon the type of product desired. Rubbery products are usually obtained if the halogen content is low. With a fairly high halogen content, thermoplastic resins capable of being molded into various articles are obtained while with a very high holgen content, very hard resins which are especially suitable for chemically resistant surface coatings, as well as for molding, are obtained. Products having a chlorine content as high as 75 weight percent are readily produced by the methods of this invention. Corresponding brominated products may also be produced with the percentage of bromine being higher on account of its higher atomic weight. If desired, chlorine and bromine can both be used in the same reaction mixture. Products which have a halogen content in the range of 5 to 30 weight percent are rubber-like or elastomeric in nature and can be vulcanized and can therefore be used in a variety of applications. Products containing at least 60 weight percent halogen will have greater heat stability and chemical resistance than products with lower halogen content.

Reaction temperatures can range from 0° C. to the reflux temperature of the solvent. However, temperatures most generally preferred are in the range between 10° C. and 100° C., most generally in the range between 20° C. and 70° C. Lower temperatures are applicable as are temperatures above 100° C. Pressures near atmospheric are usually employed, although higher or lower pressures can be used.

The products prepared in accordance with the process of this invention possess a wide variety of properties ranging from rubbery materials to hard resins. All of the products of the invention can be vulcanized or cured through the halogen present and/or through any double bonds remaining in the polymer to produce new products. The unvulcanized products of the invention are useful for making molded articles such as disks, rods, and various shaped objects, as an ingredient in the preparation of paints and other chemically resistant surface coatings, and as an ingredient in inks. Molded and cast shapes can be made from the unvulcanized products, but containing vulcanizing ingredients, and then the products can be vulcanized to obtain molded shapes which are not thermoplastic. The properties of the products vary, depending upon the polymer employed, as well as on the degree of halogenation. If the starting material is, for instance, a rubbery polybutadiene, products containing chlorine in amounts up to 30 weight percent are rubbery, those containing chlorine in amounts up to 50–60 weight percent are of the plastic type, and those containing above 60 weight percent chlorine are hard resins.

As stated, the halogenated products of this invention can contain varying amounts of combined halogen. Chlorinated products can contain as much as 75 weight percent chlorine, or as little as 4 or 5 weight percent. Higher or lower amounts of chlorine are within the scope of the invention.

The base ethylenically unsaturated polymers, i. e., the starting materials, employed in the process of our invention have a molecular weight of at least 250, and can range from liquid to solid materials.

Example I

Polybutadiene was prepared by emulsion polymerization at 41° F. in accordance with the following recipe:

| | Parts by weight |
|---|---|
| Water | 180 |
| Butadiene | 100 |
| Rosin soap, potassium salt [1] | 4.5 |
| KOH | 0.1 |
| Daxad 11 [2] | 0.1 |
| KCl | 0.4 |
| $K_4P_2O_7$ | 0.127 |
| $FeSO_4 \cdot 7H_2O$ | 0.10 |
| Diisopropylbenzene hydroperoxide | 0.07 |
| Tert-dodecyl mercaptan | 0.41 |

[1] Dresinate 214; pH of soap solution, 10.8.
[2] Sodium salt of condensed alkyl aryl sulfonic acid.

A booster of one-half the original charge of $K_4P_2O_7$, $FeSO_4 \cdot 7H_2O$ and diisopropylbenzene hydroperoxide was added at 14.3 hours (37 percent conversion). A conversion of 57 percent was reached in 17.7 hours. The reaction was short-stopped with 0.15 part Goodrite 3955 (50/50 mixture of sodium dimethyldithiocarbamate and sulfur in the form of sodium polysulfide), based on monomers, and 1.5 percent by weight, based on the polymer, of phenyl-beta-naphthylamine was added as the antioxidant.

Ten grams of the above-described polybutadiene was dissolved in 600 ml. (957 grams) of carbon tetrachloride. Approximately 10–15 ml. of the solvent was removed by vacuum distillation. The purpose of this step in the process was to remove any moisture which might have been retained by the polymer. After the vacuum distillation, 90 ml. (71.4 grams) of absolute methanol was added, the mixture was cooled to 15° C. and stirred while 14 grams of chlorine was introduced over a period of approximately 30 minutes. Temperature during the addition of chlorine was maintained at 10–20° C. The reaction mixture was then heated to 50° C. and maintained at this temperature for 30 minutes while it was stirred. Coagulation was effected by pouring the mixture into approximately 2 liters of isopropyl alcohol. The product, chlorinated-methoxylated polybutadiene, was separated by filtration and dried in a vacuum oven at 50° C. It was a hard, white, thermoplastic resin which was soluble in carbon tetrachloride, had a chlorine content of 37.4 weight percent and an oxygen content of 8.0 weight percent. Disks were molded at 270 and 300° F.

Example II

One hundred grams of polybutadiene prepared as described in Example I was dissolved in 3 liters (4785 grams) of carbon tetrachloride, water was removed by distilling approximately 30 ml. of the solvent by vacuum distillation, the mixture was heated to 40° C., and 550 ml. (436 grams) of absolute methanol was added. Chlorine (125 grams) was introduced over a 5-hour period while the temperature was maintained at 40–50° C., and the mixture was stirred. The reaction mixture was poured into approximately 6 liters of isopropyl alcohol to coagulate the product which was separated by filtration and dried 5 hours under vacuum at 50° C. Ferro 909* stabilizer dissolved in acetone was milled into the plastic product using a hot mill (212° F.). The product, chlorinated-methoxylated polybutadiene, was then dried in a vacuum oven at 50° C. to remove the acetone. It was a

*An epoxy resin employed as a heat stabilizer.

slightly yellow thermoplastic resin which was soluble in benzene and acetone and had a chlorine content of 38.1 weight percent. Various physical properties were determined. Specimens for the impact test were made by injection molding and others were made by compression molding. Results were as follows:

| | |
|---|---|
| Tensile strength, p. s. i | 1160 |
| Elongation, percent | 340 |
| Impact, ft. lbs. per inch of notch [1] | 0.446 |
| Flex temperature, ° F | 52 |

[1] ASTM D256—47 T, cantilever beam test (Izod type).

Example III

A portion of the chlorinated-methoxylated product prepared in Example II was compounded in accordance with the following recipe:

| | Parts by weight |
|---|---|
| Chlorinated-methoxylated product | 100 |
| MgO | 20 |
| Staybelite resin [1] | 1 |
| Tetrone A [2] | 1 |

[1] Hydrogenated rosin.
[2] Dipentamethylenethiuram tetrasulfide.

The materials were blended on a mill at 212° F. The composition became hard and brittle on the mill but could still be molded. It was cured at 310° F. for 30 minutes. The cured slab had a tensile strength of 6158 p. s. i., an elongation of 48 percent, and a swell in benzene of 182 percent when immersed 48 hours at room temperature (approximately 25° C.). The cured resin was insoluble in acetone.

Example IV

Two hundred grams of polybutadiene prepared as described in Example I was dissolved in 3 liters (4785 grams) of carbon tetrachloride and any water present was removed by vacuum distillation of approximately 30 ml. of the solvent. A mixture of 600 ml. (476 grams) of methanol and 400 ml. (638 grams) of carbon tetrachloride was added, the material was heated to 40° C. and 40 grams chlorine was introduced over a one-hour period while the temperature was maintained at 40–50° C., and the mixture was stirred. The mixture was poured into approximately 6 liters of isopropyl alcohol to which 4–5 grams of antioxidant 2246 [2,2-methylene-bis(4-methyl-6-tert-butylphenol)] had been added. The coagulated product was separated by decantation, washed with isopropyl alcohol, and dried in a vacuum oven at 40° C. It was a rubbery material. Various samples were compounded in different ways, the ingredients being mixed on a cold rubber mill. The compounded samples were cured at 310° F. and physical properties determined. One sample was reserved for a control. No compounding ingredients were added but it was heated at 310° F. Another control was run on a compounded sample of the original polybutadiene. The compounding recipes are given below. All quantities are parts by weight.

| | Sample No. | | | | | |
|---|---|---|---|---|---|---|
| | 1 | 2 | 3 | 4 | 5 | 6 |
| Chlorinated-methoxylated Polybutadiene | 40 | 40 | 40 | 40 | 40 | |
| Polybutadiene | | | | | | 40 |
| Pyridine | | 8.9 | 8.9 | | | |
| MgO | | | | 8 | 4 | 4 |
| Staybelite resin [1] | | | 0.4 | 0.4 | 1 | 1 |
| Tetrone A [1] | | | 0.4 | 0.4 | 0.67 | 0.67 |
| Sulfur | | | | | 0.67 | 0.67 |
| ZnO | | | | | 0.67 | 0.67 |

[1] As in Example III.

Physical properties were determined on the cured samples. Results were as follows:

| Sample No. | Tensile, p. s. i. | Elongation, Percent | Swell, Percent [1] | Extracted, Percent [1] | Cure-Time, min. |
| --- | --- | --- | --- | --- | --- |
| 1 [2] | 92 | 40 | 264 | 61.3 | 50 |
| 2 | 133 | 60 | 558 | 54.7 | 50 |
| 3 | 428 | 200 | 456 | 5.8 | 30 |
| 4 | 474 | 130 | 424 | 10.2 | 30 |
| 5 | 945 | 250 | 310 | 3.8 | 50 |
| 6 [3] | 236 | 205 | 267 | 9.4 | 50 |

[1] Samples immersed 45 hours at room temperature in a mixture of 7 volumes of isooctane and 3 volumes of toluene (ASTM D471 52T).
[2] Control, cured but no compounding ingredients.
[3] Original polybutadiene, compounded and cured.

Example V

Polybutadiene, having a Mooney value (ML–4) of 43, was prepared by emulsion polymerization at 41° F. in accordance with the following recipe:

| | Parts by weight |
| --- | --- |
| Butadiene | 100 |
| Water | 180 |
| Rosin soap, potassium salt [1] | 4.5 |
| Diisopropylbenzene hydroperoxide | 0.1 |
| Sodium formaldehyde sulfoxylate | 0.1 |
| $FeSO_4 \cdot 7H_2O$ | 0.02 |
| Versene [2] | 0.04 |
| KCl | 0.5 |
| Tert-dodecyl mercaptan | 0.85 |

[1] Dresinate 214.
[2] Tetrasodium salt of ethylenediamine tetracetic acid.

A conversion of 61 percent was reached in 8.25 hours. The reaction was shortstopped with di-tert-butylhydroquinone (0.15 percent by weight, based on the polymer) and one percent by weight, based on the polymer, of tris-nonyl phenyl phosphite (Polygard) was added as the antioxidant.

Polybutadiene (150 grams), prepared as described above, was dissolved in 2.5 liters (3987 grams) of carbon tetrachloride and any water present was removed by distilling approximately 30 ml. of solvent under vacuum. A mixture of 550 ml. (436 grams) of absolute methanol and 800 ml. (1276 grams) of carbon tetrachloride was added, the mixture was stirred, heated to 50° C., and 172 grams of chlorine was introduced over a 6-hour period. The temperature was maintained at 50–55° C. during introduction of the chlorine. A vacuum distillation was then carried out to remove all the unreacted methanol and HCl. A total of 3.5 liters (5582 grams) of carbon tetrachloride was added from time to time to replace the solvent which was removed. Chlorination was then continued for a period of 5 days using ultraviolet light as a catalyst. The total chlorine introduced at this stage was 775 grams. The product was coagulated by pouring it into approximately six liters of isopropyl alcohol, separated by filtration, washed with isopropyl alcohol and dried in a vacuum oven at 50° C. The product, chlorinated-methoxylated polybutadiene, had a chlorine content of 74.2 weight percent and an oxygen content of 3.2 percent. It was a very hard, slightly yellow, thermoplastic resin which was soluble in carbon tetrachloride.

Example VI

Two samples of chloro and di-sec-amylphenoxy substituted polybutadiene were prepared and tested, as follows:

One hundred grams of polybutadiene prepared as in Example I was dissolved in 1.8 liters (2871 grams) of carbon tetrachloride and one liter (910 grams) of di-sec-amylphenol was added. The mixture was heated to 40° C., and vacuum distilled to remove any water present. This process was continued until approximately 30 ml. of solvent had distilled. Chlorine was introduced while the mixture was stirred. The temperature ranged from 25–60° C. After 50 grams of chlorine had been introduced, one liter (1595 grams) of carbon tetrachloride was added to reduce the viscosity of the reaction mixture. Stirring was continued and more chlorine was added until 290 grams had been introduced. At this time the reaction mixture was divided. One portion, hereinafter designated as A, was coagulated by pouring it into isopropyl alcohol. The second portion, hereinafter designated as B, 210 grams more chlorine was added and the product was then recovered by coagulation with isopropyl alcohol. Four grams of an epoxy resin heat stabilizer (Ferro 909) dissolved in acetone was milled into A at about 200° F. Similarly, 12 grams of the heat stabilizer was milled into B. Both products were dried in a vacuum oven at 50° C. Product A contained 33.5 weight percent chlorine and B contained 41.1 weight percent chlorine. Physical properties were determined and gave the following results:

| | A | B |
| --- | --- | --- |
| Maximum tensile, p. s. i. | 1,750 | 2,065 |
| Elongation, percent | 102 | 233 |
| Flex temperature, °F. | 56 | 69 |

Example VII

Runs were made using polybutadiene dissolved in either carbon tetrachloride or benzene, adding different reactive oxygen-containing compounds, and introducing chlorine into the mixture. The amount of reactive oxygen-containing compound was regulated to prevent any of the polymer from precipitating. After addition of chlorine, products were coagulated with isopropyl alcohol, separated, and dried in a vacuum oven at 50° C. In the table which follows, the types of materials used and results obtained are given.

| Reactive Oxygen-containing Compound | Inert Solvent | Comments |
| --- | --- | --- |
| None | $CCl_4$ | Insoluble product formed immediately. |
| $CH_3OH$ | $CCl_4$ | Product soluble in benzene (41.4 weight percent chlorine). |
| Isopropanol | Benzene | Product soluble in $CCl_4$. |
| Acetic acid | $CCl_4$ | Do. |
| n-Octanol | Benzene | Rubbery product soluble in $CCl_4$. |
| Ethylene glycol monobutyl ether. | do | Soft plastic product soluble in $CCl_4$ (35.4 weight percent chlorine). |
| Di-tert-amylphenol | $CCl_4$ | Soft resinous product soluble in $CCl_4$ (27.8 weight percent chlorine). |
| Lactic acid | $CCl_4$ | Insoluble product formed immediately. |
| n-Butyl lactate | $CCl_4$ | Insoluble product formed. |

The products of the runs employing methanol, isopropanol, acetic acid, n-octanol, ethylene glycol monobutyl ether and di-tert-amlyphenol each contained chloro substituents and, respectively, also contained methoxy, isopropoxy, acetoxy, octoxy, 3-oxa-heptoxy, and di-tert-amylphenoxy substituent groups along the polymer chain.

Example VIII

A butadiene/ethyl acrylate copolymer was prepared by emulsion polymerization at 122° F. in accordance with the following recipe:

| | Parts by weight |
| --- | --- |
| Butadiene | 75 |
| Ethyl acrylate | 25 |
| Sodium fatty acid soap | 5 |
| Water | 180 |
| $K_2S_2O_8$ | 0.3 |
| Mercaptan blend [1] | 0.45 |

[1] A blend of tertiary $C_{12}$, $C_{14}$ and $C_{16}$ aliphatic mercaptans in a ratio of 3 : 1 : parts by weight.

A conversion of 60 percent was obtained in 8 hours.

Fifty-six grams of the butadiene/ethyl acrylate copolymer was dissolved in 1.5 liters (1341 grams) of benzene and approximately 250 ml. (223.5 grams) of the solvent was distilled in vacuum to remove any moisture which might be present. Two portions of the remaining solution, 40 ml. each, were removed and designated A and B. They were treated as follows:

A. Glacial acetic acid in an amount of approximately 40 percent of the total volume was added, the solution was heated on a water bath, and chlorine was introduced until the mixture turned green. No gel was formed. Coagulation was effected by pouring the material into isopropyl alcohol. The product was separated by filtration and dried in a vacuum oven. The chloro and acetoxy substituted copolymer was a hard, white, thermoplastic resin which had a chlorine content of 36.9 weight percent. It was soluble in chloroform.

B. The mixture was diluted with benzene to a volume equal to that in part A and heated on a water bath. Chlorine was introduced until the mixture turned green. A gelled material was obtained. It was poured into isopropyl alcohol, separated by filtration, and dried. The product was insoluble in chloroform. It had a chlorine content of 40.9 weight percent.

One liter (1050 grams) of glacial acetic acid was added to the benzene solution of the polymer which remained after removal of parts A and B. The mixture was cooled to 10° C. and chlorine was introduced while the temperature was held at 10–15° C. until a total of 96 grams had been added. The mixture was poured into isopropyl alcohol to coagulate the product which was then soaked in isopropyl alcohol for two days. This material was soluble in acetone. Five grams of Ferro 909 in acetone solution was added to the coagulated product and the material was dried in air. The chloro and acetoxy substituted copolymer had a chlorine content of 33.7 weight percent. A determination of physical properties gave the following results:

| | |
|---|---|
| Tensile, p. s. i. | 1390 |
| Elongation, percent | 58 |
| Flex temperature, °F | +66 |
| Heat distortion temperature, °F | +88 |
| Impact strength, ft. lbs./inch of notch | 0.58 |

[1] ASTM D256–47T, cantilever beam test (Izod type).

*Example IX*

An 85/15 butadiene/ethyl acrylate copolymer was prepared by emulsion polymerization at 41° F. in accordance with the following recipe:

| | Parts by weight |
|---|---|
| Water | 192 |
| Methanol | 48 |
| Butadiene | 85 |
| Ethyl acrylate | 15 |
| Potassium fatty acid soap [1] | 5 |
| $K_4P_2O_7$ | 0.136 |
| $FeSO_4.7H_2O$ | 0.14 |
| Tert-butylisopropylbenzene hydroperoxide | 0.104 |
| Mercaptan blend [2] | 0.23 |

[1] Potassium Office Synthetic Rubber Soap.
[2] As in preceding example.

A conversion of 60.2 percent was reached in 7.4 hours. The polymer had a Mooney value (ML–4) of 44.

One hundred grams of the 85/15 butadiene/ethyl acrylate copolymer was dissolved in 2.5 liters (2235 grams) of benzene and an amount of glacial acetic acid equal to 30 percent by volume of the solution was added (approximately 0.75 liter, 787 grams). The solution was stirred, 500 ml. (447 grams) more benzene was added, and chlorine was introduced while the temperature was maintained at 20–30° C. After 318 grams of chlorine had been added the mixture was allowed to stand approximately 16 hours and then coagulated by pouring it into isopropyl alcohol. The solid product was filtered, washed with isopropyl alcohol and dried in a vacuum oven. It was soluble in acetone and chloroform. The chloro and acetoxy substituted copolymer had a chlorine content of 43.0 weight percent.

*Example X*

A 70/30 butadiene/acrylic acid copolymer was prepared by emulsion polymerization at 41° F. in accordance with the following recipe:

| | Parts by weight |
|---|---|
| Butadiene | 70 |
| Acrylic acid | 30 |
| Water | 180 |
| Duponol ME [1] | 4 |
| Tert-dodecyl mercaptan | 1 |
| Diisopropylbenzene hydroperoxide | 0.107 |
| $FeSO_4.7H_2O$ | 0.139 |
| $K_4P_2O_7$ | 0.165 |
| KCl | 0.10 |

[1] Sodium lauryl sulfate.

A conversion of 60 percent was reached in 7.5 hours.

Twenty grams of the butadiene/acrylic acid copolymer was suspended in 500 ml. (447 grams) of benzene and 200 ml. (210 grams) of glacial acetic acid was added. The polymer dissolved. The solution was vacuum distilled to remove any moisture present, and 200 ml. (210 grams) more of glacial acetic acid was added. The mixture was cooled to 10° C. and 22 grams of chlorine was added while the temperature was controlled at 10–20° C. There was no tendency toward gel formation. The solution turned green toward the latter part of the chlorine addition. The mixture was poured into isopropyl alcohol to effect coagulation and the product was washed with isopropyl alcohol and dried in a vacuum oven. It was soluble in a mixture of benzene and glacial acetic acid. The chloro and acetoxy substituted copolymer chlorine content was 23.6 weight percent.

A second run was made using 20 grams of the 70/30 butadiene/acrylic acid copolymer suspended in 600 ml. (536 grams) of benzene. The mixture was vacuum distilled and 500 ml. (447 grams) more benzene was added to replace that removed by distillation. The polymer did not dissolve in benzene. The suspension was cooled to 10° C. and 59 grams of chlorine was introduced. The reaction mixture was allowed to stand for two days. The solid product was still insoluble in benzene, acetone, and chloroform.

*Example XI*

A 90/10 butadiene/acrylic acid copolymer was prepared by emulsion polymerization at 41° F. in accordance with the following recipe:

| | Parts by weight |
|---|---|
| Water | 180 |
| Butadiene | 90 |
| Acrylic acid | 10 |
| Duponol ME | 5 |
| Daxad 11 [1] | 0.1 |
| $K_4P_2O_7$ | 0.127 |
| $FeSO_4.7H_2O$ | 0.10 |
| Diisopropylbenzene hydroperoxide | 0.077 |
| Tert-dodecyl mercaptan | 0.40 |

[1] Sodium salt of condensed alkyl aryl sulfonic acid.

A conversion of 42 percent was reached in 21 hours. The polymer had a Mooney value (ML–4) of 20.

Twenty grams of the 90/10 butadiene acrylic acid copolymer was dissolved in 400 ml. of benzene. Three separate portions of the solution were treated in different ways. Glacial acetic acid was added to one portion in an amount of approximately 30 percent of the total volume of solution used. The mixture was cooled in an ice bath and chlorine was introduced until an excess was present. The chloro and acetoxy substituted copolymer product was coagulated by adding the reaction mixture to isopropyl alcohol, and dried. It was soluble in chloroform.

Methanol was added to a second portion of the butadiene/acrylic acid copolymer solution until the polymer just remained in solution. The mixture was cooled in an ice bath and an excess of chlorine was introduced. A small amount of gel formed on the inlet tube but the remainder of the polymer was soluble. It was coagulated with isopropyl alcohol and dried. A sample of the chloro and acetoxy substituted copolymer product dissolved slowly in chloroform.

A third portion of the solution was cooled in an ice bath and an excess of chlorine was added. The material gelled promptly and the inlet tube clogged.

As will be evident to those skilled in the art, various modifications of this invention can be made or followed in the light of the foregoing disclosure and discussion without departing from the spirit or scope of the disclosure or from the scope of the claims.

We claim:

1. Reaction of a polymeric material containing ethylenic unsaturation with a halogen selected from the group consisting of chlorine and bromine in the presence of a solvent and in the presence of at least one part by weight per part of said polymeric material of an organic oxygen-containing compound having only one functional reactive group.

2. The reaction of a polymeric material containing ethylenic unsaturation with a halogen selected from the group consisting of chlorine and bromine in the presence of an inert solvent and in the presence of an organic oxygen-containing compound having only one functional reactive group, said reactive group being selected from the group consisting of hydroxy and carboxy and being present in an amount at least equal in weight to the said polymeric material.

3. The product of the process comprising the reaction of a polymeric material containing ethylenic unsaturation with a halogen selected from the group consisting of chlorine and bromine in the presence of an inert solvent and in the presence of at least one part by weight per part of said polymeric material of at least one organic oxygen-containing compound having only one functional reactive group, said reactive group being selected from the group consisting of hydroxy and carboxy, said product being vulcanizable.

4. A derivative of an ethylenically unsaturated polymer prepared according to claim 3 which contains groups of the following description along the polymer chain:

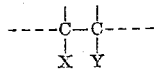

where X is selected from the group consisting of chlorine and bromine and Y is a substituent selected from the group consisting of alkoxy, cycloalkoxy, aryloxy, and acyloxy derived from a carboxylic acid.

5. A derivative of an ethylenically unsaturated polymer which contains groups of the following description along the polymer chain:

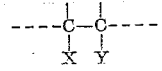

where X is selected from the group consisting of chlorine and bromine and Y is a substituent selected from the group consisting of alkoxy, cycloalkoxy, aryloxy, and acyloxy derived from a carboxylic acid, said derivative being a product of the process comprising the reaction of a polymeric material containing ethylenic unsaturation with a halogen selected from the group consisting of chlorine and bromine in the presence of an inert solvent and in the presence of an organic oxygen-containing compound having only one functional reactive group, said reactive group being selected from the group consisting of hydroxy and carboxy and being present in an amount at least equal in weight to the said polymeric material.

6. The reaction of a polymeric material having a molecular weight of at least 250 selected from the group consisting of homopolymers of conjugated dienes, copolymers of conjugated dienes, and natural rubber, with a halogen selected from the group consisting of chlorine and bromine in the presence of at least 1 part per part of said polymeric material of at least one organic compound selected from the group consisting of an organic hydroxy compound and a carboxylic acid, said organic compound containing only one functional reactive group, said reaction being effected in the presence of a solvent.

7. The product of the process comprising a reaction of a polymeric material having a molecular weight of at least 250 selected from the group consisting of homopolymers of conjugated dienes, copolymers of conjugated dienes, and natural rubber, said polymeric materials being free from functional reactive groups, with a halogen selected from the group consisting of chlorine and bromine in the presence of at least 1 part per part of said polymeric material of at least one organic compound selected from the group consisting of an organic hydroxy compound and a carboxylic acid, said organic compound containing only one functional reactive group, said reaction being effected in the presence of a solvent.

8. A derivative of a base polymeric material selected from the group consisting of homopolymers of conjugated dienes, copolymers of conjugated dienes, and natural rubber containing groups of the following description along the polymer chain:

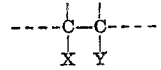

where X is selected from the group consisting of chlorine and bromine and Y is a substituent selected from the group consisting of alkoxy, cycloalkoxy, aryloxy, and acyloxy derived from a carboxylic acid, said derivative being prepared according to the process of claim 3.

9. The reaction of claim 6 where the said polymeric material is polybutadiene.

10. A product of the reaction of claim 9.

11. The reaction of base polymers, said base polymers being selected from the group consisting of natural rubber, homopolymers and copolymers with another monomer, of 1,3-butadiene, isoprene, chloroprene, piperylene, 2,3-dimethyl-1,3-butadiene, phenyl butadiene, 2,3-dimethyl 1,3-hexadiene, 2-methoxy-1,3-butadiene; said another monomer being selected from the group consisting of at least one other of the foregoing compounds, styrene, alpha methyl styrene, isobutylene, an alkyl styrene, an alkoxy styrene, and a halogen-substituted styrene, acrylic and methacrylic acids and their esters, such as methyl, ethyl, propyl, isopropyl, isobutyl, normal butyl, acrylates and methacrylates; methyl vinyl ketone, methyl isopropenyl ketone, acrylonitrile, methacrylonitrile, methacrylamide, 2-phenyl-4-hydroxy-1-butene, dimethylvinylethynyl carbinol, hydroxyethyl acrylate, hydroxyethyl methacrylate, hydroxyethyl styrene, 2-vinylpyridine, 2-methyl-5-vinylpyridine, 2,3,4-trimethyl-5 - vinylpyridine, 2,6-dimethyl-4-vinylpyridine, vinyl acetate, vinyl chloride, vinylidene chloride, vinylfurane, vinyl carbazole, and 2-hydroxyethyl-5-vinylpyridine, with a halogen selected from the group consisting of chlorine and bromine, in the presence of at least 1 part by weight per part of said base polymer of at least one of the compounds selected from the group consisting of methanol, ethanol, isopropanol, 1-butanol, 2-butanol, isobutyl alcohol, 1-pentanol, 2-pentanol, 1-hexanol, 2-hexanol, isoheptyl alcohol, octanol, phenol, di-sec-amylphenol, di-tert-amylphenol, ortho-cresol, meta-cresol, para-cresol, 2,3-xylenol, 2,4-xylenol, 2,5-xylenol, 2,6-xylenol, 3,4-xylenol, para-tert-butylphenol, butoxyphenol, para-methoxyphenol, ortho-ethylphenol, meta-ethylphenol, para-ethylphenol, 1-naphthol, 2-naphthol, cyclohexanol, acetic acid, propanoic acid, butanoic acid, 2-methylpropanoic acid, pentanoic acid, hexanoic acid, octanoic acid, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, diethylene glycol monomethyl ether and diethylene glycol monoethyl ether, and in the presence of a solvent selected from the group consisting of carbon tetrachloride, chloroform, tetrachloroethane, chlorobenzene, benzene, toluene, and xylene.

12. Chlorinated-methoxylated polybutadiene producing according to the reaction of claim 22.

13. Chloro and isopropoxy substituted polybutadiene producing according to the reaction of claim 23.

14. Chlorinated-acetoxylated polybutadiene producing according to the reaction of claim 24.

15. Chloro and n-octoxy substituted polybutadiene producing according to the reaction of claim 26.

16. Chloro and 3-oxa-heptoxy substituted polybutadiene producing according to the reaction of claim 26.

17. The reaction of claim 6 wherein the said polymeric material has a molecular weight of at least 250 and is present in said solvent in a concentration, based on the combined weight of solvent and polymer, in the range between 0.5 and 50 weight percent, the temperature is in the range between 10 and 100° C., and wherein the said organic compound has a molecular weight below 350.

18. A product of vulcanization of chlorinated-methoxylated polybutadiene made by vulcanizing said chlorinated-methoxylated polybutadiene in the presence of at least one of the group consisting of sulfur, dipentamethylene thiuram tetrasulfide, magnesium oxide and pyridine.

19. A process comprising dissolving a polymeric material containing ethylenic unsaturation and being free from functional reactive groups in an inert solvent to form a solution, adding to said solution at least one part per part of polymer of an oxygen-containing organic compound in an amount less than that which will cause said polymeric material to precipitate from said solution but in at least as great an amount as the weight of said polymeric material, said organic compound having only one functional reactive group which is selected from the group consisting of an organic hydroxy compound and a carboxy compound, adding to said solution at least one halogen selected from the group consisting of chlorine and bromine, allowing said halogen to react with the said polymeric material in the presence of said organic compound, allowing reaction to take place, recovering unreacted organic compound and then recovering the resulting reaction product from solution.

20. A product of claim 7 wherein the reaction is carried out until there has been added to the polymeric material an amount of said halogen corresponding to approximately 5 to 30 weight percent of the product.

21. A derivative of an ethylenically unsaturated polymer prepared according to claim 3 which contains groups of the following description along the polymer chain:

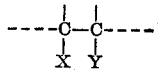

where X is selected from the group consisting of chlorine and bromine and Y is a substituent selected from the group consisting of alkoxy, cycloalkoxy, aryloxy, and acyloxy derived from a carboxylic acid, and contains an amount of said halogen corresponding to about 5 to 30 weight percent of said derivative.

22. The reaction of polybutadiene with chlorine in the presence of an inert solvent and in the presence of at least one part of methanol per part of said polybutadiene and thereby producing chlorinated-methoxylated polybutadiene.

23. The reaction of polybutadiene with chlorine in the presence of a solvent and in the presence of at least one part of isopropanol per part of said polybutadiene and thereby producing chloro and isopropoxy substituted polybutadiene.

24. The reaction of polybutadiene with chlorine in the presence of a solvent and in the presence of at least one part of acetic acid per part of polybutadiene and thereby producing chlorinated-acetoxylated polybutadiene.

25. The reaction of polybutadiene with chlorine in the presence of an inert solvent and in the presence of at least one part of n-octanol per part of polybutadiene and thereby producing chloro and n-octoxy substituted polybutadiene.

26. The reaction of polybutadiene with chlorine in the presence of an inert solvent and in the presence of at least one part of ethylene glycol monobutylether per part of polybutadiene and thereby producing chloro and 3-oxaheptoxy substituted polybutadiene.

References Cited in the file of this patent
UNITED STATES PATENTS

| | | |
|---|---|---|
| 2,072,255 | Gebauer et al. | Mar. 2, 1937 |
| 2,327,517 | Frolich et al. | Aug. 24, 1943 |
| 2,524,424 | Buret | Oct. 3, 1950 |